United States Patent [19]
Flohr

[11] Patent Number: 4,498,137
[45] Date of Patent: * Feb. 5, 1985

[54] PROGRAMMABLE REFINER CONTROLLER WITH HORSEPOWER-DAYS PER TON SCALING

[75] Inventor: Gary R. Flohr, Lenox, Mass.

[73] Assignee: Beloit Corporation, Beloit, Wis.

[ * ] Notice: The portion of the term of this patent subsequent to Jan. 15, 1997 has been disclaimed.

[21] Appl. No.: 370,577

[22] Filed: Apr. 21, 1982

[51] Int. Cl.³ ........................ G06F 15/46; B02C 7/14; D21F 1/04

[52] U.S. Cl. .................................... 364/471; 162/254; 162/263; 241/36; 241/37

[58] Field of Search ................ 364/469, 471, 152-154; 241/36, 37; 162/198, 254, 263, 266

[56] References Cited

U.S. PATENT DOCUMENTS

| | | | |
|---|---|---|---|
| 3,490,689 | 1/1970 | Hart et al. | 364/471 |
| 3,604,645 | 9/1971 | Keyes | 241/37 |
| 3,604,646 | 9/1971 | Keyes et al. | 241/36 |
| 3,620,915 | 11/1971 | Keyes et al. | 162/98 |
| 3,630,836 | 12/1971 | Bietry et al. | 241/37 |
| 3,654,075 | 4/1972 | Keyes et al. | 241/36 |
| 4,184,204 | 1/1980 | Flohr | 364/471 |

*Primary Examiner*—James D. Thomas
*Assistant Examiner*—Dale M. Shaw
*Attorney, Agent, or Firm*—Hill, Van Santen, Steadman & Simpson

[57] ABSTRACT

A programmable refiner controller which is an improvement over the system described in U.S. Pat. No. 4,184,204 and allows the appropriate ratio to be selected for calculating the correct values of factors P1 and P2 to obtain the proper controller gain while maintaining the transfer function for the consistency range utilized. The maximum energy per ton limit can be established to protect the refining system for over-refining or possibly breaking the disk elements inside the refiner. The controller-ratio or remote set point resolution can be increased in the instrument set point. The invention provides the operator with a control tuned so that the dial on the remote set point module indicates not only the ratio and arbitrary net horsepower days per ton, but the exact energy used per ton of material paper stock.

5 Claims, 2 Drawing Figures

PROGRAMMABLE REFINER CONTROLLER WITH HORSEPOWER-DAYS PER TON SCALING

BACKGROUND OF THE INVENTION

1. Field of the Invention

This invention relates in general to control systems for paper refineries and in particular to a novel programmable refiner controller.

2. Description of the Prior Art

This invention is an improvement on U.S. Pat. No. 4,184,204 which issued on Jan. 15, 1980 to Gary R. Flohr and which is assigned to the same assignee as the present application. U.S. patents such as U.S. Pat. No. 3,604,646 which issued on Sept. 14, 1971 assigned to the assignee of the present invention and in which the inventors are Marion A. Keyes IV and John A. Gudaz and U.S. Pat. No. 3,654,075 which issued on Apr. 4, 1972 in which the inventors are Marion A. Keyes IV and John A. Gudaz assigned to the assignee of the present invention disclose control systems for paper refineries and the disclosure of these patents referenced herein is hereby incorporated by reference in this disclosure.

SUMMARY OF THE INVENTION

The present invention comprises a programmable refiner controller which utilizes a microprocessor and wherein a consistency transmitter and a flow transmitter produce signals which are combined and scaled so as to relate the input with the output and where the controller operator can set the energy limits as horsepower per day per ton and the initial consistency range can be satisfied as desired.

The invention comprises an automatic controller which can be adapted for operation with consistency transmitters of different ranges so as to provide accurate control.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
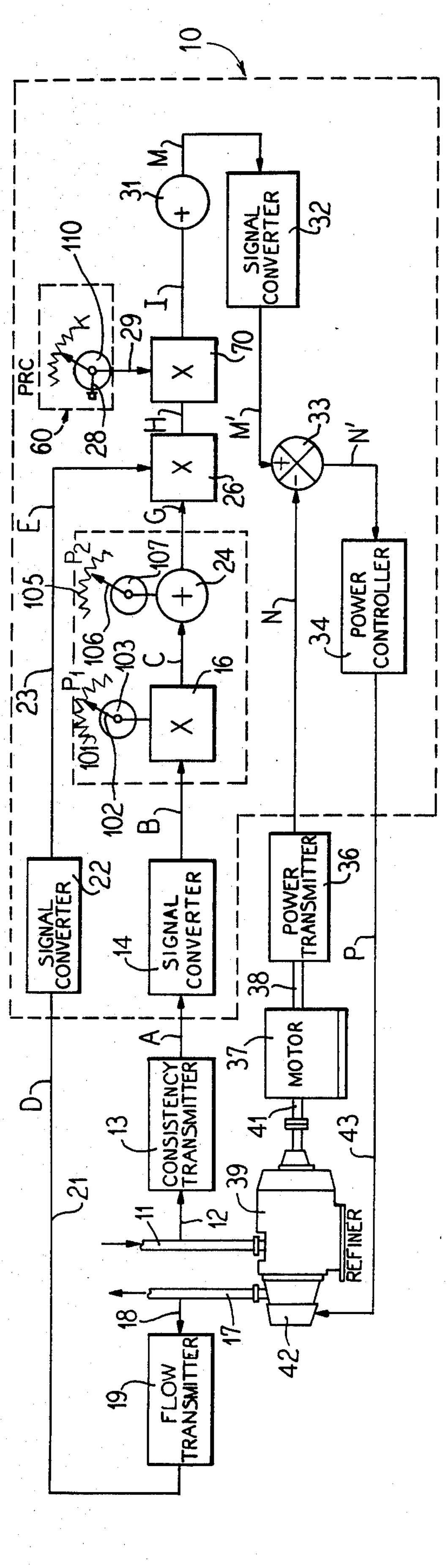
FIG. 1 is a block diagram illustrating the novel controller of the invention.
Figure 2:
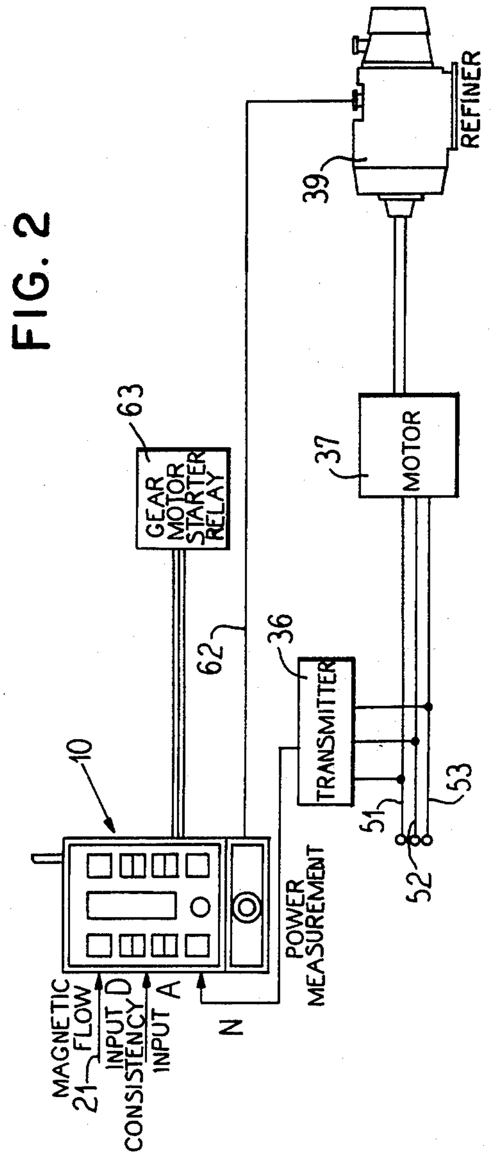
FIG. 2 is a block diagram in greater detail of a portion of the apparatus.

The invention comprises a microprocessor which is programmable and a refiner controller PRC whereby two mass flow inputs comprising consistency and flow are utilized to control the refiner.

In the present invention, the total mass flow at a given time x is multiplied by a ratio to produce a calculated kilowatt or horsepower value. This value is the analog output of the controller and by means of an off-on or end-out outputs to the final control element, the calculated kilowatt or horsepower is obtained. The result in horsepower per unit time (day) per ton of mass flow input is related by referencing a precalculated table comprising all of the following inputs to both the programmable controller and a computer program which produces the calculated table. The inputs to both devices result in a fixed or constant net horsepower per day per ton for a given ratio. (Table below)

In my prior U.S. Pat. No. 4,184,204, the factors P1 and P2 discussed and disclose therein were adjusted merely for the customers consistency range.

In this invention, P1 and P2 are adjusted not only for the customer's consistency but also to accomplish "scaling".

So as to give a better understanding of "scaling", consider the following:

Definitions for understanding invention and particularly "scaling".

1. Transfer Function as applied to a linear system is the ratio of the transform of the output to the transform of the input.

$$F(s) = \text{Transfer Function} = \frac{\text{Output }(s)}{\text{Input }(s)}$$

EXAMPLE 1

Transform °C. ⟶ °F.

0° C. $X + y$ = 32° F.

100° C. $X + y$ = 212° F.

So $OX + y$ = 32° F. or $y = 32$ $100X = 180$ $X = 1.8$

So the transfer function is

°C. $X$ [1.8 + 32] = °F.

or

°F. output = Input °C. $X$ 1.8 + 32

This transfer function assumes a summing point

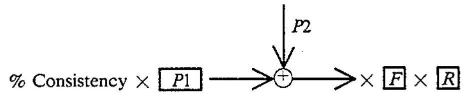

By varying P1 and P2 linearly or by increasing or decreasing each by the same factor we can vary the gain of the whole expression of $$\frac{\text{output HP}}{\text{input } T/D}$$

without affecting the gain magnitude ratio of the consistency input. This is because of the following.

If both P1 and P2 are decreased by a 0.47 factor then P1=47 and P2=23.

Assuming that no consistency signal is present, therefore the adder P2 is added to 0 and multiplied by the flow F, resulting is a Hp which is 0.47 times smaller.

The same 0.47 factor must also apply to the consistency signal in order to custom scale the unit. Therefore P1 is reduced by a 0.47 factor to reduce the gain of the consistency signal. P2 is required, to allow the control gain to be constant when the consistency signal is not present. Note, the consistency signal is non-zero based, if the consistency signal of 0–100% did represent an actual measured range of 0% consistency=0% signal, then P2 could be totally eliminated, because, at 0% consistency or 0% signal, there would be no wood fiber present and only a flow of water through the refiner machine elements, therefore there would be no tons/-day and no resultant horsepower (output) calculated.

But in the paper industry, no commercial consistency sensor or transmitter is available which measures in units of 0% consistency to a maximum consistency (example of 3%). So, with non-zero based initial conditions we must provide an adder (P2) or pedestal for the control to operate on in the condition of zero consistency signal.

The invention comprises a microprocessor programmable refiner controller (PRC) whereby two mass flow inputs are utilized.

In the present invention the total mass flow at a given time X is multiplied by a ratio to result in a calculated KW or horsepower value. This value is the analog output of the controller and by means of on-off or in-out outputs to the final control element (34) the calculated KW or horsepower is achieved. The resultant horsepower per unit time (day) per ton of mass flow input is related to by referencing a pre-calculated table comprising all of the following inputs to both the programmable controller and the computer program which produced the calculated table. The inputs to both devices, result in a fixed or constant net horsepower per day per ton for a given ratio as seen in the first two columns of FIG. 3 of U.S. Pat. No. 4,184,204.

The invention is useful, whereby in that the invention allows the maximum net HPD/T (normally constant) which is attainable at the maximum ratio setting of a potentiometer to be decreased or increased to provide a:

1. Direct 1 to 1 correspondence between ratio dial indicator (visible to operator) and the resultant controller output in net horsepower per day per ton for these ratio potentiometer ranges.

0–1 Ratio
0–3 Ratio
0–5 Ratio
0–10 Ratio
0–15 Ratio

2. A maximum net HPD/T (energy) attainable at any time for any input mass flow condition. These advantages are useful.

1.A. The operator and/or instrument technician now visually sees the resultant output KW or Hp/T divided by the input mass (tonnage) and does not have to refer to other means such as a 1. Precalculated table
2. Computing machinery for indication only B. Increased controller ratio (output/input) gain resolution provides greater accuracy in controller ratio set point tuning. Therefore, at a ratio of 5.0 exactly 5.0 net HPD/T is desired. The calculation is as follows. Previously in the prior art a ratio of 2.9 resulted in 14.01 net HPD/T therefore the controller gain must be decreased by 2.9/14.01. The controller $$\frac{\text{output in Kw or Hp}}{\text{input in tons per day}} = \text{Gain} = \frac{\text{HP-Day}}{\text{Ton}}$$

is decreased by multiplying both of the precalculated values of P1 and P2 by the calculated factor as follows:

$$2.9/14.01 = .20699 \times (18) = .20699 \times 18.1818 = 3.7635^{P1}$$

$$.20699 \times (90) = .20699 \times 90.909 = 18.817^{P2'}$$

Therefore the controller gain has been decreased in such a way that the (transfer function) as applied to signal B (consistency signal) has remained constant as shown below.

Consistency Range 3.5–4.2

Consistency Input % full scale=50% or 3.85%BD $$50 \times \mathbf{P1} + \mathbf{P2} = \text{Factor}$$

Consistency Input % full scale=100% or 4.2% BD $$100 \times \mathbf{P1} + \mathbf{P2} = \text{Factor}$$

EXAMPLE

Original P1 and P2 for 3.5–4.2% consistency $$50\% \times \underset{(18)}{.001818} + \underset{(91)}{.90909} = .9999 \text{ or } 1.0$$

$$100\% \times .001818 + .90909 = 1.0909$$

Therefore a consistency transmitter change of 50% to 100% output for a 3.5–4.2 range applies a gain of 1.0909 to the calculated Kw or Hp.

New value of P1 and P2

$$50\% \times 0.00037635 + 0.18817 = 0.20699$$

$$100\% \times 0.00037635 + 0.18817 = 0.22581$$

Gain Factor=0.22581/0.20699=1.0909

Therefore the gain ratio (or consistency factor) is unchanged while the total gain has been reduced to produce the "scaling" effect.

2. The maximum net HPD/T (energy per unit time per ton) attainable is now preset according to A. Customer refining requirements B. Energy or horsepower supporting characteristics of refined material (pulp)

C. Loading limitations prescribed by the machine rotating and stationary elements and stress limitations.

The controller is scaled as follows. The consistency factor is calculated from the range of input consistency employed. The computer program is run, which calculates the net HPD/T for a ratio range of 0–3.0. An analysis is made of the customer refining requirements and his particular pulp loading characteristics. An example is that the customer requires a maximum of 8.1 net HPD/T in his refining system. Therefore a ratio range of 0–10 would be useful for this application.

EXAMPLE OF A COMPUTER PRINTOUT FOR THE INVENTION

| Ratio Multiplier 3 | | | | | |
|---|---|---|---|---|---|
| Controller Consistency and No-Load Bias Factors | | | | | |
| | P1 | | P2 | | Bias % |
| | 47 | | 23 | | 22 |
| | | KILOWATTS AT GIVEN FLOW RATES AND CONSISTENCIES | | | |
| | NET | % BD: 2 | 1 | 2 | 1 |
| RATIO | HP/T/D | GPM 300 | 300 | 350 | 350 |
| .1 | .11 | 59 | 57 | 59 | 58 |

-continued

| | | | | | |
|---|---|---|---|---|---|
| .4 | .41 | 67 | 61 | 68 | 62 |
| .7 | .71 | 75 | 65 | 78 | 67 |
| 1 | 1.01 | 83 | 69 | 87 | 72 |
| 1.3 | 1.31 | 91 | 73 | 97 | 76 |
| 1.6 | 1.6 | 99 | 77 | 106 | 81 |
| 1.9 | 1.9 | 107 | 81 | 115 | 86 |
| 2.2 | 2.2 | 115 | 85 | 125 | 90 |
| 2.5 | 2.5 | 123 | 90 | 134 | 95 |
| 2.8 | 2.79 | 131 | 94 | 144 | 100 |
| 3.1 | 3.09 | 139 | 98 | 153 | 105 |
| 3.4 | 3.39 | 147 | 102 | 162 | 109 |
| 3.7 | 3.69 | 155 | 106 | 172 | 114 |
| 4 | 3.99 | 163 | 110 | 181 | 119 |
| 4.3 | 4.28 | 171 | 114 | 191 | 123 |
| 4.6 | 4.58 | 179 | 118 | 200 | 128 |
| 4.9 | 4.92 | 188 | 122 | 209 | 133 |
| 5.2 | 5.21 | 196 | 126 | 219 | 137 |
| 5.5 | 5.51 | 204 | 130 | 228 | 142 |
| 5.8 | 5.81 | 212 | 134 | 238 | 147 |
| 6.1 | 6.11 | 220 | 138 | 247 | 152 |
| 6.4 | 6.41 | 228 | 142 | 256 | 156 |
| 6.7 | 6.7 | 236 | 146 | 266 | 161 |
| 7 | 7 | 244 | 150 | 275 | 166 |
| 7.3 | 7.3 | 252 | 154 | 285 | 170 |
| 7.6 | 7.6 | 260 | 158 | 294 | 175 |
| 7.9 | 7.9 | 268 | 162 | 303 | 180 |
| 8.2 | 8.19 | 276 | 166 | 313 | 184 |
| 8.5 | 8.49 | 284 | 170 | 322 | 189 |
| 8.8 | 8.79 | 292 | 174 | 332 | 194 |
| 9.1 | 9.09 | 300 | 178 | 341 | 199 |
| 9.4 | 9.39 | 308 | 182 | 350 | 203 |
| 9.7 | 9.68 | 316 | 186 | 360 | 208 |
| 10 | 10.02 | 325 | 190 | 369 | 213 |

% BD = Percent Bone Dry Fiber Weight
GPM = Gallons Per Minute (U.S.)

EXAMPLE OF THE U.S. PAT. NO. 4,184,204 WHERE P1 AND P2 ARE ADJUSTED FOR THE CONSISTENCY RANGE ONLY

| | | Ratio Multiplier 3 Controller Consistency and No-Load Bias Factors | | | |
|---|---|---|---|---|---|
| | P1 | P2 | | Bias % | |
| | 100 | 50 | | 22 | |
| | | KILOWATTS AT GIVEN FLOW RATES AND CONSISTENCIES | | | |
| | NET | % BD: 2 | 1 | 2 | 1 |
| RATIO | HP/T/D | GPM 300 | 300 | 350 | 350 |
| .1 | .71 | 75 | 65 | 78 | 67 |
| .2 | 1.38 | 93 | 75 | 100 | 78 |
| .3 | 2.09 | 112 | 84 | 122 | 89 |
| .4 | 2.79 | 131 | 93 | 143 | 100 |
| .5 | 3.5 | 150 | 103 | 165 | 111 |
| .6 | 4.17 | 168 | 112 | 187 | 122 |
| .7 | 4.88 | 187 | 122 | 209 | 133 |
| .8 | 5.59 | 206 | 131 | 231 | 143 |
| .9 | 6.29 | 225 | 140 | 253 | 154 |
| 1 | 6.96 | 243 | 150 | 275 | 165 |
| 1.1 | 7.67 | 262 | 159 | 297 | 176 |
| 1.2 | 8.38 | 281 | 168 | 318 | 187 |
| 1.3 | 9.09 | 300 | 178 | 340 | 198 |
| 1.4 | 9.76 | 318 | 187 | 362 | 209 |
| 1.5 | 10.47 | 337 | 197 | 384 | 220 |
| 1.6 | 11.17 | 356 | 206 | 406 | 231 |
| 1.7 | 11.88 | 375 | 215 | 428 | 242 |
| 1.8 | 12.55 | 393 | 225 | 450 | 253 |
| 1.9 | 13.26 | 412 | 234 | 472 | 264 |
| 2 | 13.97 | 431 | 243 | 493 | 275 |
| 2.1 | 14.67 | 450 | 253 | 515 | 286 |
| 2.2 | 15.34 | 468 | 262 | 537 | 297 |
| 2.3 | 16.05 | 487 | 272 | 559 | 308 |
| 2.4 | 16.76 | 506 | 281 | 581 | 318 |
| 2.5 | 17.47 | 525 | 290 | 603 | 329 |
| 2.6 | 18.14 | 543 | 300 | 625 | 340 |
| 2.7 | 18.84 | 562 | 309 | 647 | 351 |
| 2.8 | 19.55 | 581 | 318 | 668 | 362 |
| 2.9 | 20.26 | 600 | 328 | 690 | 373 |

-continued

| | | | | | |
|---|---|---|---|---|---|
| 3 | 20.93 | 618 | 337 | 712 | 384 |

FIG. 1 illustrates a motor 37 which drives through its output shaft 41 and a clutch, a refiner 39 that might be such as described in U.S. Pat. No. 3,654,075. The refiner has a suitable beater element and the fluid stock enters the refiner 39 through the inlet conduit 11 and is discharged through an outlet conduit 17 and the heavy fiber stock is refined and moves through the conduit 17 and is forwarded to the paper making machine where it is made into paper. The refiner includes rotary and stationary disk elements which depending upon the position between them as determined by a positioning mechanism 42 that moves the elements relative to each other and determines the amount of refining work applied to the stock.

The consistency transmitter 13 receives an input 12 from conduit 11 and produces an output signal A indicative of the consistency of the stock in the conduit 11. A flow transmitter 19 receives an input 18 from the conduit 17 and produces an output signal on line 21 which indicates the amount of flow through the conduit 17.

The outputs of the flow transmitter 19 and the consistency transmitter 13 are supplied to a programmable refiner controller indicated by 10 which includes the signal converter 14. The signal converter 14 changes the input analog signal A to a signal B which represents the percentage full scale of the transmitter 13. As is described in U.S. Pat. No. 4,184,204 the output signal B indicates the percentage full scale of the transmitter 13. The signal converter 22 performs a similar function for the flow measurement signal D appearing on lead 21 and converts it into a percentage flow signal E that is furnished to lead 23. After the signal has been converted to a percentage signal, the consistency signal B is transformed to a mass factor by multiplying the signal B by an adjustable constant P1 in the multiplier 16 to obtain a signal C. The value P1 can be set by the potentiometer 101 by moving the wiper contact 102 and the setting can be indicated on the dial 103. The signal C is supplied to an adder 24 which receives another adjustable constant P2 from a source such as potentiometer 105 which can be set with a wiper contact 106 and has a dial 107 for setting the potentiometer. The multiplier 26 receives the output G of the adder 24 and also receives an input from the signal converter 22 on line 23 which comprises the signal E. The signal H is multiplied in a multiplier 70 by a factor determined by a ratio set point potentiometer 60 which can be set by a shaft 28 that controls a wiper contact and the setting can be indicated by a dial 110. The output of multiplier 70 is supplied to a bias adding means 31 which supplies a fixed bias to the signal I and produces a signal M indicative of the net horsepower day per ton which is supplied to the signal converter 32. A comparator 33 receives the output of the signal converter as well as the output of the power transmitter 36 which is driven by the motor 37 and the power control 34 controls the positioning mechanism 42 of the refiner.

Specific examples are:

| Industrial process conditions example | |
|---|---|
| Gross connected motor horsepower | 250 |
| No-load motor horsepower bias | 75 |
| Maximum flow rate (input gallons per minute | 400 |

-continued

| Industrial process conditions example | |
|---|---|
| Minimum consistency % BD | 1% |
| Maximum consistency % BD | 3% |
| Constants ratio multiplier range | 0–3 |
| No-load motor horsepower | 75 |

$$\text{Consistency conditioning constants} \quad \frac{\text{minimum consistency}}{\text{mean consistency}} = P2 = \frac{1\%}{2\%} = .50$$

$$P1 = \frac{1 - P2}{50} = 0.0100$$

This results in control output maximum

As shown on the attached computer listing of the ratio multiplier versus net horsepower per day per ton example, $$\frac{\text{maximum ratio multiplier}}{3.0} \quad \frac{\text{maximum result in net HP}D/T}{20.93}$$

Desired control output
As shown in the attached computer listing
1. Refining requirements 0–10 Net HPD/T
2. Ratio potentiometer range 0–10
Scaling calculation example $$\text{Gain factor} = \frac{\text{desired maximum net HP}D/T}{\text{maximum net HP}D/T\text{ (example)}} = 10.00/20.93 = 0.478.$$

Ratio potentiometer range=original 0–3.00
Custom scale version 0–10.00.
Modifications required for proper input/output response. Software conditioning.

Gain factor×P1=P1′

Gain factor×P2=P2′

0.478×0.50=0.239=P1′

0.478×0.0100=0.478=P2′

Thus, it is seen that this invention allows the operator to set the wiper contacts 102, 106 and 28 against the dials 103, 107 and 110 so as to indicate not only the ratio and arbitrary net horsepower days per ton, but the exact energy used per ton of material paper stock.

As applied to industrial process instrumentation the term "scaling" can have several meanings. One definition is the "sizing" or modification of a measurement signal to product a desired input-output response from an instrument or device. An indicating instrument that requires standard signal levels to produce zero and 100% responses serve as an illustration. To give a meaningful indication of the measurement, the transmitter at the measuring point must be calibrated (scaled) so that a specific range of measurement will produce zero and 100% signal levels corresponding to the indicator requirements. The indication of the instrument then relates to the process condition (pressure, temperature, flow rate, etc.). The indicator scale might not be linear as the signal generated by the transmitter might not have a linear correlation with the process variable. When the transmitter cannot be calibrated (scaled) before the signal reaches the indicator either the indicator must be modified or an interface component must be interposed to modify (scale) the received signal and produce a signal that matches the indicator. In the invention, such scaling occurs.

Many process variables are not as convenient to measure as temperature. Often two or more signals must be combined to achieve the desired measurement. Examples of this situation are:

Flow totalization of two or more streams, and mass flow rates of solids in a slurry proportional to volume flow rate multiplied by the percentage and density of solids.

Although the invention has been described with respect to preferred embodiments, it is not to be so limited as changes and modifications can be made which are within the full intended scope of the invention as defined by the appended claims.

I claim as my invention:

1. An apparatus for controlling a paper refiner with a load control for processing paper stock including a motor driving said refiner, comprising a consistency transmitter having a predetermined output signal range for measuring the consistency of the paper stock at the refiner and producing an analog signal, a flow transmitter for measuring flow of paper stock through said refiner, a first signal converter receiving the output of said consistency transmitter and converting it into a signal indicative of the percentage of full scale of said consistency transmitter, a first multiplier receiving the output of said first signal converter and multiplying it by a first constant P1 that is determined by the signal range for the particular consistency transmitter, means for setting said constant P1 to a scaled value, an adder receiving the output of said first multiplier and adding to it a signal proportional to a second constant P2 determined by the signal range for the particular consistency transmitter, means for setting said constant P2 to a scaled value, a second signal converter connected to said flow transmitter and converting the flow transmitter signal into a signal indicative of percentage of full range of said flow transmitter, and a second multiplier receiving the outputs of said second converter and said adder and multiplying them together to obtain a signal indicative of tons of material per day flowing through said refiner.

2. An apparatus according to claim 1 including a third multiplier receiving the output of said second multiplier, and a first ratio set point signal source supplying an input to said third multiplier.

3. An apparatus according to claim 2 including a second bias adder receiving the output of said third multiplier and adding a bias signal thereto.

4. An apparatus according to claim 3 including a signal converter receiving the output of said second bias adder to convert the signal to an analog signal, and a power transmitter connected to said motor to measure motor output, a comparator receiving the output of said power transmitter and the output of said signal converter, and a power controller connected to said comparator and supplying an input to said load control of said refiner.

5. An apparatus according to claim 4 wherein said means for setting said constants P1 and P2 to scaled values comprise variable potentiometers.

* * * * *